United States Patent
Vass et al.

[15] 3,690,255
[45] Sept. 12, 1972

[54] LIQUID PROPELLANT CARTRIDGE

[72] Inventors: Edward J. Vass, Los Alamitos; Richard H. Braun, Downey; Conrad R. Platt, Huntington Beach, all of Calif.

[73] Assignee: The United States of America as represented by the Secretary of the Air Force

[22] Filed: Oct. 1, 1970

[21] Appl. No.: 77,160

[52] U.S. Cl. ..........................102/39, 89/7, 60/26.1
[51] Int. Cl. ..................................................F42b 3/04
[58] Field of Search ..........60/218, 26.1, 39.48; 89/7; 81/1; 102/39

[56] References Cited

UNITED STATES PATENTS

| 2,918,791 | 12/1959 | Greiner | 60/39.48 X |
| 2,984,973 | 5/1961 | Stegelman | 60/39.48 X |
| 2,872,870 | 2/1959 | Gey | 102/39 X |
| 3,195,407 | 7/1965 | Turner | 89/7 |

Primary Examiner—Samuel W. Engle
Attorney—Harry A. Herbert, Jr. and Ruth G. Codier

[57] ABSTRACT

A system for controlled generation of high energy gas from a liquid propellant, based upon a differential area piston injecting liquid propellant into a combustion chamber in a regenerative cycle. One of its applications is for cartridge bomb ejection. Pressure of burning fuel fired by a primer ruptures seals in a piston wall and causes extrusion of liquid fuel from a reservoir area into the piston cavity which lies in the combustion area. Combustion of the extruded liquid carries on a regenerative process until all fuel in the reservoir has been consumed.

1 Claim, 5 Drawing Figures

INVENTOR
EDWARD J. VASS
RICHARD H. BRAUN
CONRAD R. PLATT

ATTORNEYS

LIQUID PROPELLANT CARTRIDGE

BACKGROUND OF THE INVENTION

This invention relates to a system for controlled generation of high energy gas from a liquid propellant, and more particularly to a device which includes a differential area piston for a liquid propellant cartridge in a bomb ejection system.

Difficulty has been experienced in controlling combustion rates. Systems were proposed based on a regulated flow of liquid propellant from a two chamber cartridge. This was expected to extend the burn time of the liquid propellant to achieve relatively long, low-pressure time curves. The liquid propellant was ignited with a primer in the first of the two chambers. The combustion in the first chamber located next to the primer was expected to exert a pressure on a movable piston which, in turn, pressurized the liquid propellant in a second chamber and ejected it into a combustion area. The rate at which the liquid burned in the combustion chamber regulated the flow rate of the liquid through the orifice connecting the two chambers. The time of orifice opening was expected to be controlled by a differential piston connected directly to the material to be ejected. Ignition of the liquid from the second chamber was expected to be accomplished by flame bleedoff into a pass channel from the first chamber.

The problem with this approach is typical of any concept dependent on the confined burning of bulk liquid propellant. The burning rate cannot be controlled as it is a function of the liquid's surface area. As ignition and burning of the liquid take place, the surface area of the liquid increases rapidly in a random manner to the extent that the burning process can occur at the detonation rate of the liquid.

Other difficulties arose. Erosion became a problem. Contamination occurred, particularly aluminum particles injected from the cartridge case into the bomb rack system.

Furthermore, normal propyl nitrate (NPN), a liquid propellant in general use, is incompatible with many plastics and metals. Good sealing methods were difficult to accomplish.

SUMMARY OF THE INVENTION

The objects of the invention are therefore, to provide a regenerative system and a device which will:

a. reduce reactive forces by controlling the combustion rate of the liquid propellant;

b. increase the mean time between ejection-system failures by using a liquid propellant having a low-combustion temperature, thus decreasing erosion;

c. reduce system contamination by decreasing residue through using liquid propellants and by minimizing the quantity of aluminum particles injected from the cartridge case into the system; and d. enable the system to withstand high temperatures. Epoxy adhesive and polythelane plugs are to be used in the piston orifices. Ethylene propylene and Teflon are used for 0-rings and piston seals. The piston casing is a one-piece steel case.

These and other advantages, features and objects of the invention will become more apparent from the following description taken in connection with the illustrative embodiments in the accompanying drawings.

DESCRIPTION OF THE PREFERRED EMBODIMENT

Figure 1:
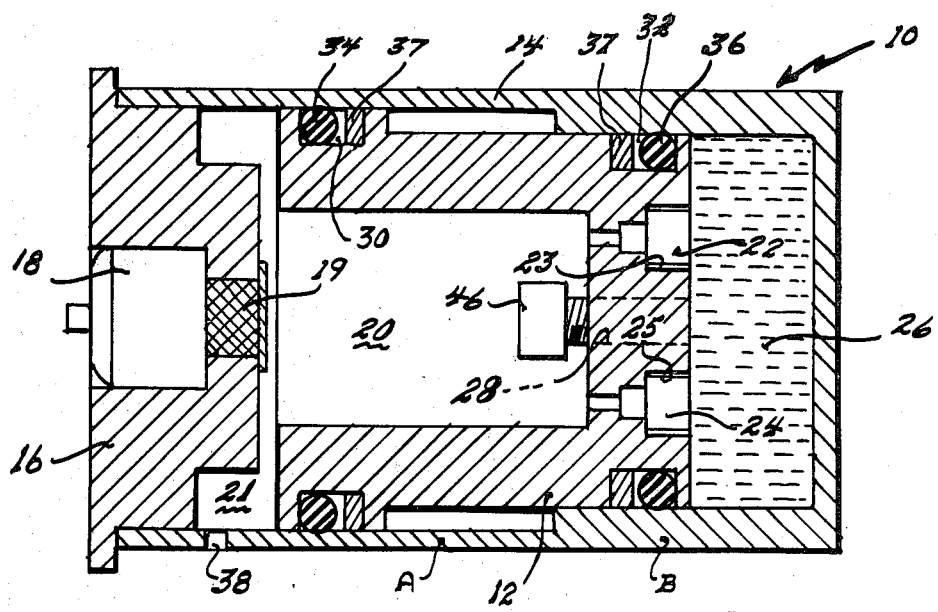
FIG. 1 is a longitudinal sectional view of the cartridge assembly.
Figure 3:
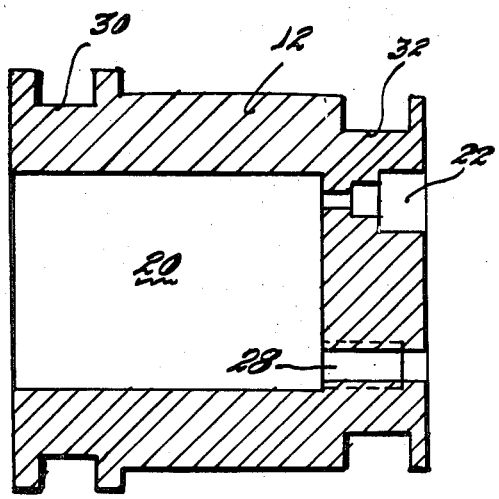
FIG. 3 is a longitudinal sectional view of the piston removed from the casing and taken on the line 3—3 of FIG. 2.
Figure 2:
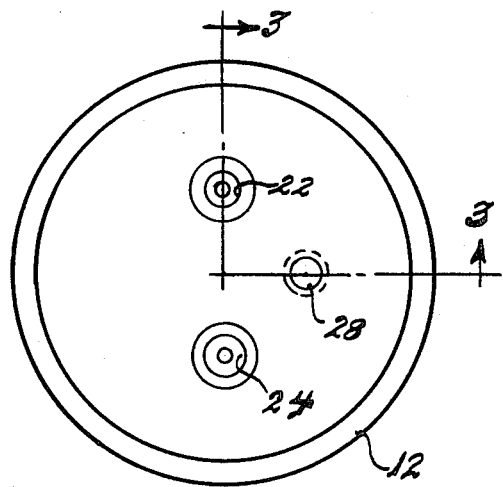
FIG. 2 is a diagrammatic view of the piston face showing the location of the fill hole and extrusion orifices.

The cartridge assembly is indicated generally by the numeral 10. A differential area piston 12 is assembled into a casing 14 and sealed into place by a closure 16. A primer assembly 18 is located in a bore in the closure 16. The bore extends completely through the closure 16, accommodating also the ignition mix 19, when function is to ignite the liquid propellant within a first chamber 20. The piston 12, the casing 14, and the closure element 16 are fabricated of heat-treated steel for strength and resistance to erosion. The piston 12 has a free-volume internal cavity 21 to reduce the initial combustion pressure. A pair of orifices, 22 and 24, provide a metering entrance of the liquid burning material from the second chamber 26 to the first chamber 20. The opening 28 functions as a fill hole. The piston 12 is provided with grooves or recesses 30 and 32 to accommodate the 0-rings 34 and 36. The recesses, 30 and 32, also accommodate the retaining rings 37. The casing 14 has two areas A and B with a differential internal diameter. The piston 12 has a corresponding differential in external diameters to fit within areas A and B of the casing 14, thus forming the chambers 20 and 26.

The first or combustion chamber 20 is provided with an exhaust port orifice 38. The closure 16 has an annular shoulder which aligns the assembly 10 when inserted into a cartridge holder (not shown).

Since the liquid propellant normal propyl nitrate or NPN which is used is incompatible with many plastics and metals, the orifices 22 and 24 in the piston 12 are sealed with epoxy adhesive and polyethylene plugs or aluminum tape.

The 0-rings 34 and 36 are of ethylene propylene, or comparable material and the retaining rings 37 are Teflon.

After the piston 12 has been inserted into the steel casing 14 the liquid propellant is inserted through the hole 28. The method used is to inject the liquid through the hole 28 by means of a hypodermic needle and syringe so that any entrapped air will bleed back through the hole. The quantity of fuel injected is measured and the hole sealed when the operation is completed.

The closure plug 16 containing the primer assembly 18 is sealed onto the casing 14 with an epoxy seal.

The polyethylene plugs or aluminum tape used to cover the holes 22 and 24 rupture when the movement of the piston applies sufficient pressure against the NPN in the reservoir cavity 26. Until the proper pressure is applied, all of the NPN is contained in the cartridge case 14 and held within the reservoir 27, since the cavity 26 is sealed by the piston 0-ring 36. The cavity 20 which is the combustion chamber is sealed by the piston 0-ring 34, by the taped orifice 38 and the screw 46 closing the orifice 28.

When the pressure caused by the initial firing reaches a predetermined level the sealing material of the orifices 22 and 24 rupture. The pressure of the piston 12 against the NPN causes extrusion of NPN into the chamber 20. The bores 22 and 24 are provided with counterbores 23 and 25 at the NPN piston surface into which the sealing material can lodge without clogging the orifice.

MODE OF OPERATION

The liquid propellant cartridge functions in the following sequence:

Upon application of a firing pulse from a power supply (not shown) the pyrotechnic mixture 19 within the primer 18 ignites. Gas pressure and burning particles accumulate in the cavity 20 at the large end of the piston, and adjacent the primer 18. The cavity is designed to provide free volume for gas expansion to reduce the peak pressure. Some of the gas escapes through the exhaust port orifice 38. Simultaneous with this application of pressure, a reactive pressure greater than that existing in the first chamber 20 is created at the small end of the piston 12 in the reservoir chamber 26. This pressure differential is sufficient to cause the seals of the orifices 22, 24 and 28 to rupture, freeing the liquid fuel in the reservoir chamber and allowing it to flow through these orifices. The flow rate is regulated by the orifice size, the exhaust port size, and the differential pressure. As the liquid enters the cavity 20, it is initiated and combusts.

The piston 12 is moved against the NPN by the initial pressure of the primer and is sustained by the combustion of the liquid in the cavity 20. This causes the liquid to again be extruded through orifices 22, 24, passing from the reservoir chamber 26, through the piston orifices and into the combustion chamber 20. The residual combustion produced from the primer 18 again initiates the extruded liquid and it combusts at the large end of the piston in the cavity 20. This creates pressure in addition to that provided by the primer, regenerating the process until all the liquid in the reservoir 26 is extruded and consumed.

Figure 4:
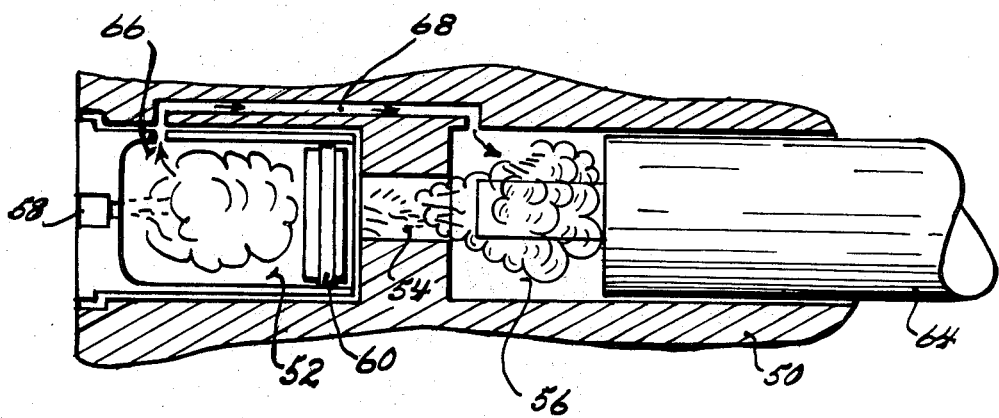
FIG. 4 is a longitudinal sectional view of a modification of the device. It is the original concept from which the preferred embodiment of FIGS. 1, 2 and 3 was developed.

Referring now to FIG. 4, this Figure is a representation of the original form of the device from which the preferred embodiment was developed.

In this embodiment, there is achieved a regulated flow of liquid propellant from a cartridge 50 provided with a pair of chambers 52 and 54 and a combustion chamber 56. In this device the burn time of the propellant was extended and relatively long, low pressure time curves were achieved. The liquid propellant is ignited with a primer 58 in the first chamber 52. The combustion in this chamber exerted pressure on the movable piston 60. With the movement of the piston 60 the liquid propellant in the second chamber 54 ejects it into the combustion area 56. The rate at which the liquid burns in the combustion chamber 56 regulates the flow rate of the liquid through the passage chamber 54. The time of passage 54 opening is controlled by a differential piston 64 connected directly to the stores (not shown) to be ejected.

Ignition of the liquid from the second chamber 56 is accomplished by a flame bleed off 66 into a by-pass channel 68.

Figure 5:
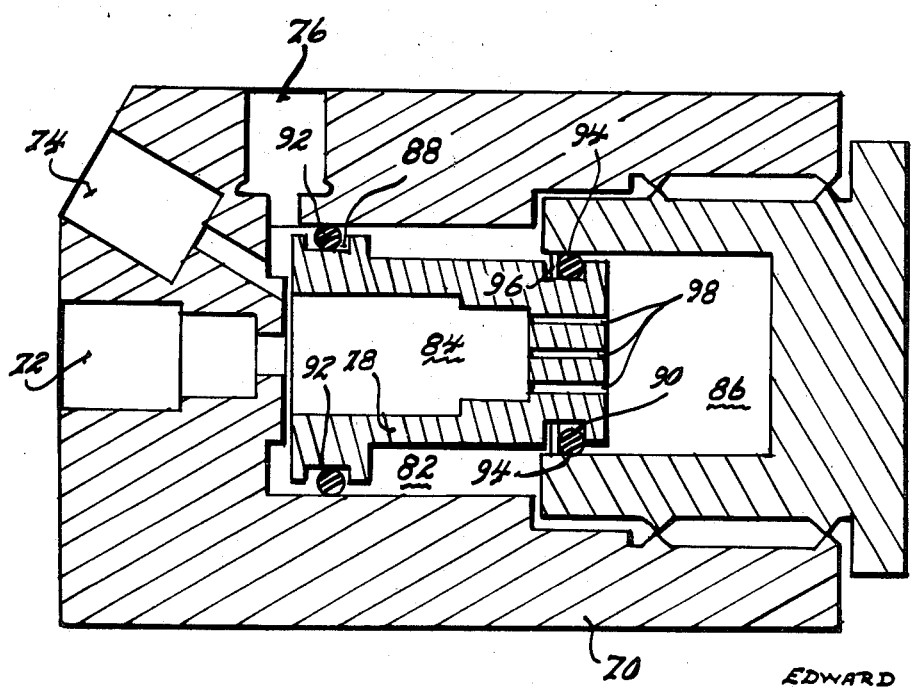
FIG. 5 is a breech assembly incorporating a modified cartridge.

Referring now to FIG. 5, a breech assembly 70 has a primer recess 72, a transducer port 74 and an exhaust port 76. A piston 78 provides a cavity 84 and separates a first chamber 82 from a combustion chamber 86. Recesses 88 and 90 house 0-rings 92 and 94 and a back-up ring 96.

Openings 98 provide a regulating flow from piston cavity area 84 to the combustion chamber 86.

In the operation of this device a regenerative process takes place as described above in the operation of the device of the preferred embodiment Although the invention has been described with reference to particular embodiments, it will be understood to those skilled in the art that the invention is capable of a variety of alternative embodiments within the spirit and scope of the appended claims.

We claim:

1. A system for controlled generation of high energy gas from a liquid propellant comprising:

a cylindrical casing having differential areas along its length, a close-fitting differential piston slidably disposed in said cylindrical casing, a reservoir chamber in said casing forward of said differential piston, a combustion chamber in the central area of said differential piston, a closure element fixedly attached to the rearward end of said casing for effectively sealing said combustion chamber, a primer housed in a recess in said closure element, said primer being in operative communication with said combustion chamber, a plurality of orifices in the closed forward end of said differential piston in communication with said reservoir chamber, said orifices being dimensioned to control the rate of flow of propellant into said combustion chamber, rupturable seals covering each of said orifices, and a vent opening in said casing between said piston and said closure element, said vent opening having a rupturable seal thereover for regulating the pressure in said combustion chamber, whereby the firing of said primer causes pressure to build up in said combustion chamber and rupture the vent opening seal while urging the piston forward until the seals covering the orifices in said differential piston are ruptured allowing liquid propellant in the reservoir chamber to pass into the combustion chamber at a controllable rate and be ignited by the residual combustion of the initial firing of said primer, thereby creating additional pressure and regenerating the process until all of the propellant in the reservoir chamber has flowed into the combustion chamber and been consumed.

* * * * *